July 26, 1938.　　　B. C. ROBBERSON ET AL　　　2,125,200
TRAFFIC OR DIRECTION SIGNALING APPARATUS
Filed June 29, 1936　　　2 Sheets-Sheet 1
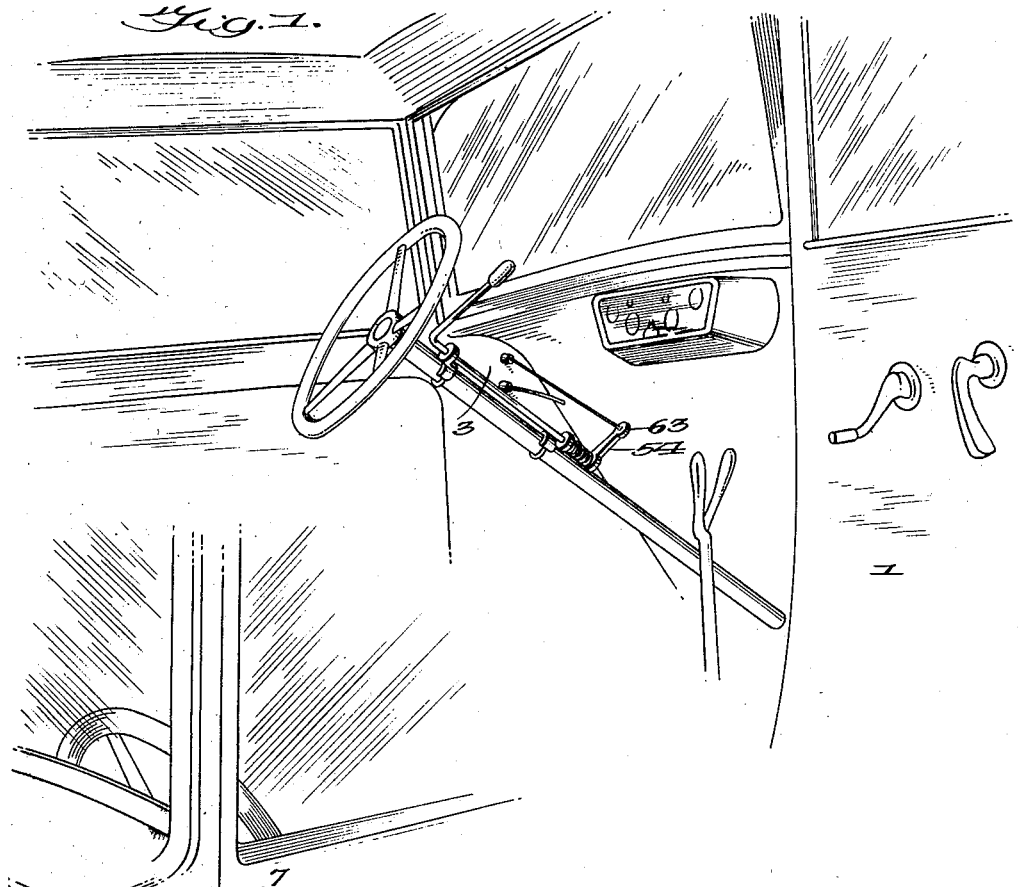
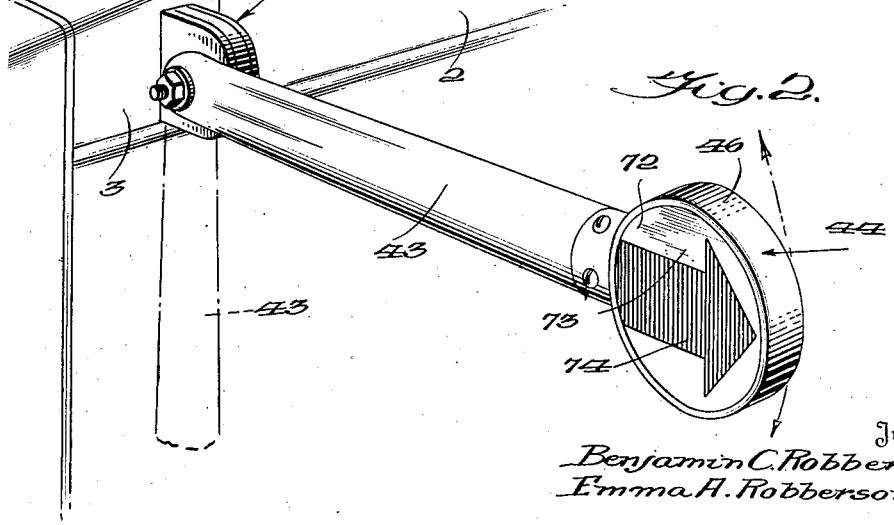
Inventors
Benjamin C. Robberson,
Emma H. Robberson,
By Kimmel & Crowell
Attorneys

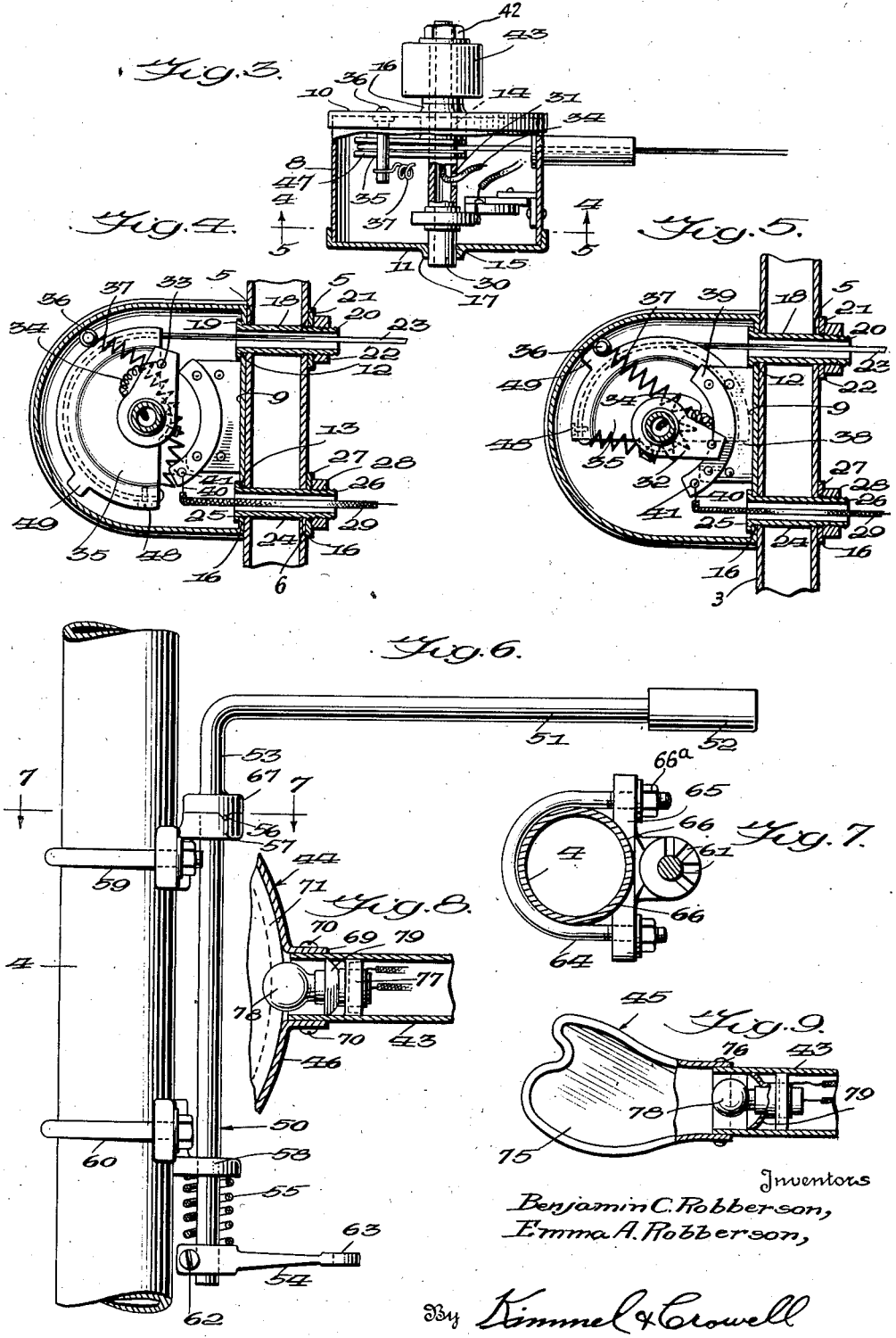

Patented July 26, 1938

2,125,200

UNITED STATES PATENT OFFICE 2,125,200

TRAFFIC OR DIRECTION SIGNALING APPARATUS

Benjamin C. Robberson and Emma A. Robberson, Seeley, Calif.

Application June 29, 1936, Serial No. 88,023

2 Claims. (Cl. 116—52)

This invention relates to a traffic or direction signaling apparatus.

The invention has for its object to provide, in a manner as hereinafter set forth, an apparatus of the class referred to adapted to be secured to and operated at will by the driver of an automotive vehicle to signal the direction of travel of the latter, without the necessity of the driver removing both hands from the vehicle's steering wheel or his feet from the vicinity of the clutch and brake pedals, thereby providing a signaling apparatus which may be operated with a maximum of safety and a minimum of effort.

A further object of the invention is to provide, in a manner as hereinafter set forth, an apparatus of the class referred to a relatively simple practical and efficient device capable of being readily manipulated by the driver of the vehicle to which it is attached for the purpose of notifying the drivers of other vehicles, pedestrians and traffic officers of the direction of movement of that vehicle to which the apparatus is applied.

Further objects of the invention are to provide, in a manner as hereinafter set forth, an apparatus of the class referred to which is strong, durable, thoroughly efficient in its use, readily installed relative to an automotive vehicle, conveniently repaired when occasion requires and comparatively inexpensive to manufacture.

With the foregoing and other objects in view, the invention consists of the novel construction, combination and arrangement of parts as will be more specifically referred to and as are illustrated in the accompanying drawings wherein is shown an embodiment of the invention, but it is to be understood that changes, variations and modifications may be resorted to which fall within the scope of the invention as claimed.

In the drawings:—

Figure 1 is a fragmentary view in perspective of an automotive vehicle looking at the interior thereof and showing the adaptation therewith of a signaling apparatus in accordance with this invention, Figure 2 is a like view looking at the exterior of the automotive vehicle showing the adaptation therewith of the signaling apparatus, Figure 3 is a fragmentary view in sectional plan of the apparatus, Figure 4 is a section on line 4—4, Figure 3, when the apparatus is in signaling position, Figure 5 is a section on line 5—5, Figure 3, when the apparatus is in normal or non-signaling position, Figure 6 is a fragmentary view in side elevation of the steering post column of an automotive vehicle showing the adaptation therewith of the rotatable spring controlled operating element of the apparatus, Figure 7 is a section on line 7—7, Figure 6, Figure 8 is a fragmentary view in vertical section of the signal element, and Figure 9 is a fragmentary view in vertical section of a modified form of signal element.

With reference to the drawings, the body of an automotive vehicle is designated 1, a body side portion forwardly of a door 2, at 3 and the steering post column of the vehicle, at 4. The apparatus is anchored to said side portion 3 and rotatably connected to the column 4. The said side portion 3 is formed with two spaced parallel pairs of spaced aligning openings. The openings of one spaced parallel pair of spaced aligning openings are indicated at 5 and those of the other pair at 6.

The apparatus includes a semi-oval shaped closed housing 7 disposed on one of its lower lengthwise edges. The housing 7 comprises a hollow body part 8 open at each side and having a flat inner wall 9 bearing against the outer face of the said portion 3, and a pair of flanged side cheeks 10, 11 which overlap the outer face of, are secured to and close the sides of body part 8. The said wall 9 is formed with a pair of spaced openings 12, 13 which register respectively with the outer openings 5, 6. The side cheeks 10, 11 are provided axially thereof with aligning openings 14, 15 respectively and bosses 16, 17 respectively on their outer faces which surround openings 14, 15 respectively. Extending through the pair of openings 5 and the opening 12 is a sleeve 18 formed with a flange 19 at its outer end and with peripheral threads 20 at its inner end. The sleeve 18 is of greater length than the width of portion 3 and extends inwardly from the latter. Mounted on sleeve 18 and abutting the inner face of portion 3 is a washer 21. The flange 19 abuts the outer face of wall 9. Threadedly engaging with the sleeve 18 is a nut 22 which in connection with flange 19 clamps housing 7 to the said portion 3. The sleeve 18 constitutes a conduit for a shaft shifting cable 23 to be more fully referred to. Extending through the pair of openings 6 and the opening 13 is a sleeve 24 formed with a flange 25 at its outer end and peripheral threads 26 at its inner end. The sleeve 24 is of greater length than the width of portion 3 and extends inwardly from the latter. Mounted on sleeve 24 and abutting the inner face of portion 3 is a washer 27. The flange 25 abuts the outer face of wall 9. Threadedly engaging with the sleeve 24 is a nut 28 which in connection with the flange 25 provides an additional clamp for securing housing 7 to the said portion 3. The sleeve 24 constitutes a conduit for an electrical conductor 29 leading from the headlight terminal on the instrument board of the vehicle.

Journaled in the openings 14, 15 of the side cheeks 10, 11 respectively, as well as the bosses 16, 17 is a signal element operating shaft 30 extended outwardly from said bosses and formed in a manner to prevent the disconnecting thereof from housing 7. The shaft 30 is tubular and formed with an opening 31. The shaft 30 has fixedly secured thereto, for bodily movement therewith a contact member 32 carrying a terminal 33 for a circuit connection 34 of a lighting circuit. The connection 34 extends through opening 31 into the shaft 30 and leads to an electric lamp carried by a signaling element to be referred to. The shaft 30 has fixedly secured thereto, for bodily movement therewith, a semicircular spring controlled carrier member 35 for the cable 23. The cheek 10 carries an inwardly extending bolt 36 to which one end of the controlling spring 37 for member 35 is attached. The spring is disposed between shaft 30 and the housing wall 9 and has its other end attached to member 35. The spring 37 is to ensure prompt return of the signal element against wind resistance.

Carried by the housing wall 9 is an insulated support 38 to which is attached a curved contact member 39 having the terminal 40 of conductor 29 connected thereto as at 41. The contact members 33, 39 coact for opening and closing the lighting circuit for the lamp in the signaling element.

Secured upon one end terminal portion of the shaft 30, exteriorly of the housing 7, by the holdfast means 42 is the tubular stem 43 of a signaling element. In Figures 2 and 8 the signaling element is indicated at 44 and in Figure 9 at 45. The signaling elements will be more fully referred to.

The curved edge of member 35 is grooved as at 47. The cable 23 is arranged within groove 47 and has one of its ends fixed to member 35 at one end of the groove 47, as at 48. The cable 23 extends from the other end of groove 47 outwardly through sleeve 18. The member 35 intermediate the ends of its grooved edge is formed with a radially disposed abutment 49 capable of impacting the bolt 36 for arresting the movement of the signal element within 45° of the vertical on its return to normal.

The apparatus includes a manually operated spring controlled suspended structure 50 for shifting the cable 23 to provide for the disposing of the signal element in its signaling positions. The said structure is suspended from column 4 and includes a handle bar 51 in convenient reach of the driver of the car. The bar 51 extends upwardly at a forward inclination relative to column 4 and is provided with a hand grip 52. The structure 50 not only includes the bar 51, but also an upstanding shaft 53 inclining rearwardly from its lower to its upper end, a crank arm 54, a controlling spring 55, a latching member 56, superposed annular bearings 57, 58, superposed clamping devices 59, 60 and a series of keepers 61 for member 56. The shaft 53 is disposed in parallel spaced relation to the front of column 4, merges at its upper end into the rear end of handle bar 51, is mounted in the bearings 57, 58, extends above bearing 57 and depends from bearing 58. The crank 54 is anchored by the holdfast means 62 to the lower end of shaft 53, extends upwardly at a forward inclination relative to the latter and is formed at its forward end with an eye 63 to which the other end of the cable 23 is anchored. The controlling spring 55 surrounds shaft 53 between bearing 58 and crank arm 54 and is anchored at one end to bearing 58 and at its other end to the crank arm 54. The spring 55 not only provides means for returning structure 50 to normal position but also acts as a means for releasably maintaining the latching member 56 in a selected keeper 61 to hold the structure 50 in position when shifted from normal. Each of the clamping devices 59 and 60 consists of a yoke 64 and a clamping strap 65 having a curved seat 66. The yokes 64 encompass and extend forwardly from column 4. The arms of the yokes extend through the ends of the straps 65. Holdfast means 66$^a$ are carried by the arms of the yokes and bear against the straps. When the holdfast means 66$^a$ are screwed home, the bases of the yokes 64 and the seats 66 on the straps 65 bind against column 4 whereby the latter and said clamping devices are fixedly secured together. The said clamping devices also constitute suspensions for the bearings 57, 58. The bearing 57 is formed integral with and centrally of the top of the strap 65 of the clamping device 59 and extends upwardly from such strap at a forward inclination. The bearing 57 also provides a support for a collar 67 integral with shaft 53 at a point between its transverse center and its upper end. The bearing 58 is formed integral with and centrally of the bottom of the straps 65 of the clamping device 59 and extends upwardly from said strap at a forward inclination.

The latching member 56 is in the form of a V-shaped lug integral with and radially disposed on the lower face of collar 67. The keepers 61 are in the form of spaced radially disposed V-shaped grooves formed in the upper face of bearing 57. The lug constituting the latching member extends from the outer edge of collar 67 to shaft 53. The grooves which provide the keepers extend from the outer to the inner edge of bearing 57.

The signal element 43 is of circular form and includes an opaque band 46 formed with an integral hollow neck 69 for receiving the outer end of stem 43. The band and stem are anchored together by the holdfast means 70. The element 43 includes a pair of spaced, transparent or translucent discs 71, 72 arranged within band 46 and each having a white portion 73 and a red portion 74 in the shape of an arrow. The discs 71, 72 are suitably secured to band 46. The signal element 45 consists of a hollow translucent or transparent member 75 of a form simulating the appearance of the human hand and wrist closed at its sides and outer end and open at its inner end. Extending into the inner end of member 75 is the outer end of stem 43. The latter and member 75 are anchored together by the holdfast means 76.

Arranged within the outer end portion of stem 43 is a support 77 for an electric lamp 78. A reflector 79 is carried by support 77.

The keepers 61 are so disposed that on coacting with latching member 56 will hold the signal element vertically at right angles to the axis of shaft 30; that another will hold the signal element upwardly at an obtuse angle relative to shaft 30; that another will hold the signal element at an acute angle relative to shaft 30; and that the other will hold the signal element horizontally at right angles to shaft 30. The structure 50 is not only rotatably, but also slidably mounted in the bearings 57, 58.

What we claim is:—

1. In a traffic or direction signaling apparatus of that type including a signal shifting and illuminating mechanism, the combination of an upstanding rearwardly inclined support, spaced upper and lower U-shaped yokes embracing said support, clamping straps with concave seats fittingly engaging said support, said straps having perforated ends receiving the ends of said U-shaped yokes, a perforated bearing member integrally formed on each strap midway between its ends, an inclined rotatable shaft disposed in lengthwise relation through said bearing members, said shaft being slidably mounted and having a handle bar at its upper end, a crank arm connected to the lower end of the shaft, said handle bar and crank arm extending upwardly at a forward inclination, a pulling cable connected to the crank arm and adapted to operate said mechanism, a controlling spring for said shaft interposed between the lower bearing member and said crank arm, and said upper bearing member and said shaft above said upper bearing having coacting means for latching said shaft in selected position when rotated from normal.

2. In a traffic or direction signaling apparatus of that type including a shiftable illuminable signal, the combination of a housing and anchoring structure therefor, a horizontally disposed shaft carried by said housing for moving the signal to and from signaling position, a revoluble actuating semi-circular member attached to said shaft, a stop lug extending radially from the curved edge of said semi-circular member, a stop pin fixed within the housing and positioned in the path of the lug, a controlling spring connected at one of its ends to said pin and at its other end to the most distant point of said semi-circular member, operating means for the signal, and said spring engaging and looped around said shaft to properly tension the same and assuming an obtuse angle with the shaft as an apex in the normal non-signaling position and being further tensioned to assume an acute angle with the shaft as an apex when said semi-circular member is revolved to signaling position.

BENJAMIN C. ROBBERSON.
EMMA A. ROBBERSON.